United States Patent [19]
Hierholzer et al.

[11] Patent Number: 5,680,216
[45] Date of Patent: Oct. 21, 1997

[54] DEVICE FOR RASTER-STEREOGRAPHIC MEASUREMENT OF BODY SURFACES

[75] Inventors: Eberhard Hierholzer; Burkhard Drerup, both of Muenster, Germany

[73] Assignee: Aesculap-Meditec GmbH, Jena, Germany

[21] Appl. No.: 619,641

[22] PCT Filed: Jul. 12, 1995

[86] PCT No.: PCT/EP95/02734

§ 371 Date: Mar. 25, 1996

§ 102(e) Date: Mar. 25, 1996

[87] PCT Pub. No.: WO96/03617

PCT Pub. Date: Feb. 8, 1996

[30] Foreign Application Priority Data

Jul. 26, 1994 [DE] Germany ............... 44 26 424.0

[51] Int. Cl.$^6$ ................................. G01B 11/24
[52] U.S. Cl. ........................... 356/376; 356/371
[58] Field of Search ...................... 356/371, 376

[56] References Cited

FOREIGN PATENT DOCUMENTS

| 0 253 185 | 1/1988 | European Pat. Off. . |
| 2-110305 | 4/1990 | Japan ................. 356/376 |

OTHER PUBLICATIONS

IEEE Transactions on Pattern Analysis and Machine Intelligence, 15 Jun. 1993 No. 6, New York, US, pp. 647–651 (Range Sensing by Projecting Multiple Slits with Random Cuts/Maruyama, et al.).

IBM Technical Disclosure Bulletin, 29 Apr. 1987, No. 11, Armonk, NY, USA pp. 4847–4848 (Color-Coded Light-–Sectioning Method).

*Primary Examiner*—F. L. Evans
*Attorney, Agent, or Firm*—McAulay Fisher Nissen Goldberg & Kiel, LLP

[57] ABSTRACT

In a device for raster-stereographic measurement of body surfaces, preferably of irregularly shaped objects, in which a raster pattern having a plurality of raster lines is projected onto the surface according to the method of raster stereography by a raster projector and a line image which is distorted by the surface shape is recorded by means of a camera which forms a stereo base with the raster projector, the raster pattern having periodically recurring, particularly emphasized lines, where the order number of the lines can be deduced from the regular recurrence of these particularly emphasized lines, the raster pattern which is projected onto the surface contains locally modulated raster lines, wherein at least adjacent raster lines are clearly distinguished from one another.

28 Claims, 3 Drawing Sheets

DEVICE FOR RASTER-STEREOGRAPHIC MEASUREMENT OF BODY SURFACES

BACKGROUND OF THE INVENTION a) Field of the Invention

The invention is directed to a device for raster-stereographic measurement of body surfaces, preferably of irregularly shaped objects. The invention is used in particular for measuring parts of the human body or other biological objects or irregularly shaped technical component parts.

b) Description of the Related Art

In conventional raster stereography, a geometrical pattern of lines or dots is projected onto the surface to be measured and is recorded from a different direction by a camera, preferably a video camera, to which is connected a process computer. Two different principles are known for projecting raster lines. In the first principle, the line raster is achieved by line-scanning the surface with a light beam (described, for example, by A. R. TURNER-SMITH, *Journal of Biomechanics* 21 [1988], 515–529). The second principle was conceived by FROBIN and HIERHOLZER (*Photogrammetric Engineering and Remote Sensing* 47 [1981], 1717–1724) and consists in a method for surface measurement by means of a projected grid containing periodically recurring lines of large thickness for a model reconstruction of the body.

A disadvantage in the method of raster stereography consists in that the entire pattern reflected by the surface being analyzed is recorded by the camera in one individual image. Although this enables a short recording time, the resulting image can be so complicated as to require a costly image analysis in order to coordinate or assign the image structures to the projected raster lines. This is indispensable for a correct model reconstruction of the body surface. For this reason, the density of the projected pattern must also not be too high, although a higher density would increase the theoretical resolution of the image. The maximum possible density depends on the surface shape, in particular on the depth modulation.

OBJECT AND SUMMARY OF THE INVENTION

Therefore, the object of the present invention is to increase the possible scanning density without impeding the image analysis.

In a device for raster-stereographic measurement of body surfaces, preferably of irregularly shaped objects, in which a raster pattern having a plurality of raster lines is projected onto the surface according to the method of raster stereography by means of a raster projector and a line image which is distorted by the surface shape is recorded by means of a camera which forms a stereo base with the raster projector, this raster pattern having periodically recurring, particularly emphasized lines, where the order number of the lines can be deduced from the regular recurrence of these particularly emphasized lines, the object according to the invention is met in that the raster pattern which is projected on the surface contains locally modulated raster lines, wherein at least adjacent raster lines are clearly distinguished from one another. For this purpose, raster lines with periodic structures of different shape are advantageously used in the raster pattern (e.g., a diapositive).

Images of harmonic oscillations, as well as sawtooth modulation images or, in a particularly advantageous manner, square-wave modulation images are preferably used for this purpose. The oscillation images can be varied with respect to amplitude, frequency and/or phase position in order to obtain various distinguishable raster lines. When the raster lines have different phase positions relative to one another, the raster pattern is to be aligned substantially parallel to the stereo base to enable accurate analysis of the raster images in the camera picture. Further, the raster lines can be modified additionally or in a supplementary manner with respect to the light wavelength and/or the line thickness.

Further, unmodulated (straight) lines are advantageously inserted between modulated raster lines. Raster lines having a different modulation in pieces of lines are also suitable.

In order to maintain a clear distinction between the raster lines (so as to be substantially distinguishable from one another also with surface-induced distortion), the raster lines are advisably repeated sequentially within the raster pattern. Such sequences of different lines can be composed of an optional number of lines in principle. However, sequences of three raster lines with different modulation are advantageous (and sufficient in most cases). Nevertheless, it is advisable (for reasons of simplicity) that the sequences also contain unmodulated raster lines. This is advantageous especially for a rough analysis in which only one type of raster line is detected.

The sequence of raster lines is formed in a particularly simple and advantageous manner by using raster lines in the form of square-wave modulation images which differ from one another appreciably with respect to amplitude and/or phase. The use of a sequence of unmodulated raster lines (square-wave oscillation with zero amplitude) and square-wave oscillation with π-shifted phase is particularly advantageous.

When the image analysis is carried out with the use of raster lines in the form of square-wave or sawtooth-wave modulation oscillations, the raster pattern is advantageously oriented substantially parallel to the stereo base and the raster lines are advantageously oriented substantially vertically with respect to the stereo base. In this way, it is ensured that the amplitude jumps (within a so-called epipolar plane of the stereographic imaging) in the focal plane of the projector and the focal plane of the camera remain parallel to one another at all times regardless of the complexity of the shape of the body surface. This substantially facilitates the image analysis.

The invention is based on the idea that the scanning density in raster stereography can only be increased when the raster lines can also be correlated in an unambiguous manner in critical regions (regions of high depth modulation of the body surface in which cross-overs and distortions in the raster lines appear in the camera image). According to the invention, this is effected by means of an individual identification at least for closely adjacent raster lines, but preferably also for a plurality of successive raster lines within the raster pattern by means of suitable modulation of the raster lines which can be analyzed in a simple manner by an automatic image processing process.

It is possible with the device according to the invention to increase the scanning density of the body surface (i.e., the line density of the raster pattern) and in so doing to ensure an unambiguous assignment of the lines in the camera image. The image analysis with respect to the line allocation can be automated in a simple manner in particular when square-wave modulation oscillations are used as raster lines.

The invention will be explained more fully in the following with reference to an embodiment example.

DESCRIPTION OF THE PREFERRED EMBODIMENTS

Figure 1:
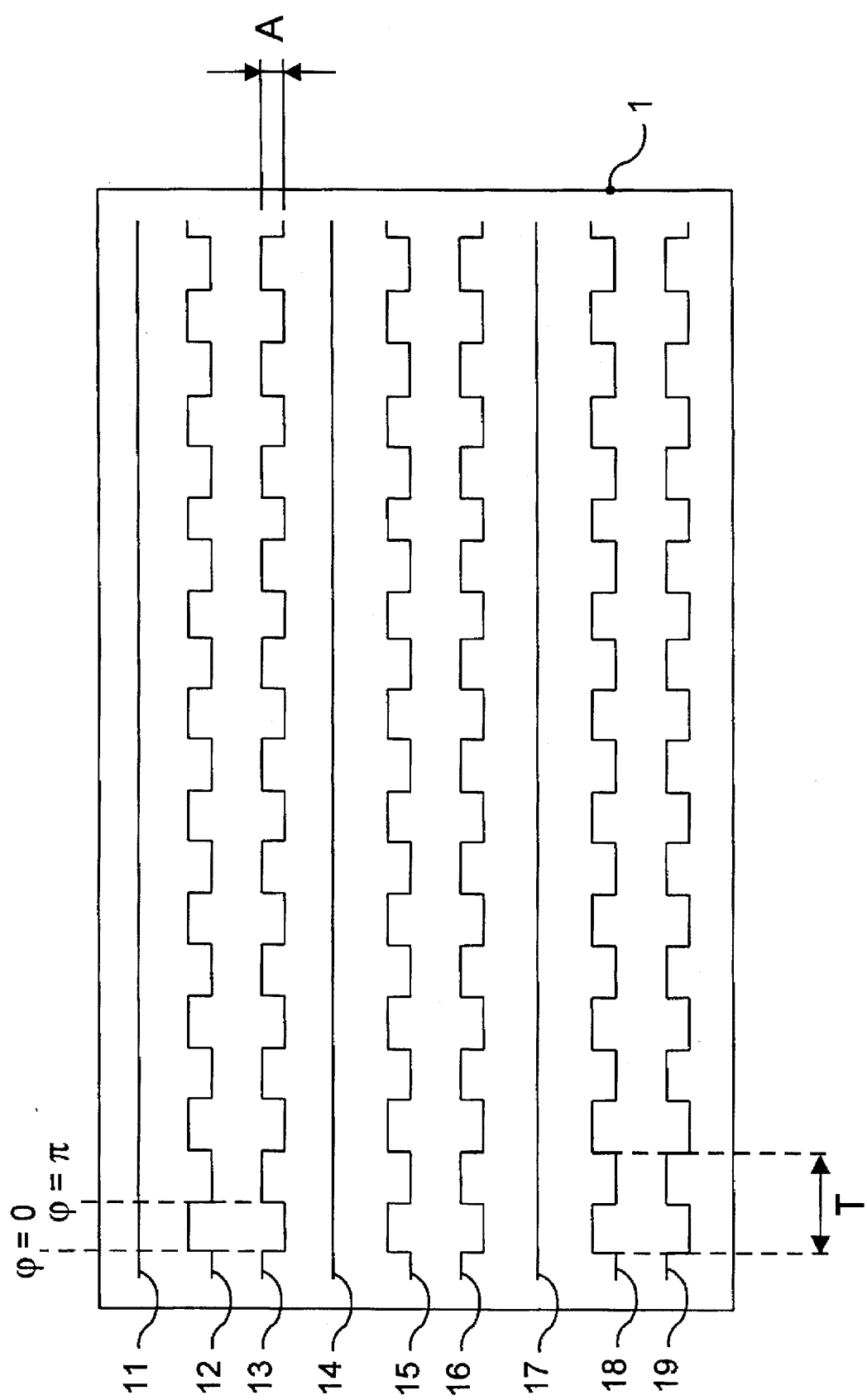
FIG. 1 shows an example for a raster pattern according to the invention.

FIG. 1 shows an example for a raster pattern as a diapositive 1 with raster lines 11 to 19 in the form of square-wave modulation oscillations. Raster lines 11, 14, 17, etc. are not modulated (amplitude 0). Raster lines 12, 15, 18, etc. are modulated at constant amplitude A and frequency 1/T, where T is the oscillation period, and with phase $\phi=0$. Raster lines 13, 16, 19, etc. are modulated at the same amplitude and frequency, but with phase $\phi=\pi$.

The unmodulated raster lines 11, 14, 17 ... can be found by prior methods by searching for smooth line pieces with a minimum length >T/2. Since these raster lines 11 to 19—all other conditions remaining the same—now have the three times the spacing, the risk of an incorrect image analysis is correspondingly reduced. The modulated raster lines 12, 15, 18 ... and 13, 16, 19 ... are not found in this part of the image analysis since the smooth line pieces are too short.

The modulated raster lines can be identified with a high degree of reliability when making use of the phase information. In the embodiment example shown in FIG. 1, the jumps take place at the same locations $$x = n \cdot T/2 \quad (n=11, 12, 13 \ldots)$$

Depending on the geometry of the recording arrangement, it is possible to predict the location of these jumps in the camera image regardless of the shape and position of the measured surface. Accordingly, during the line analysis the line shape can be demodulated in a manner similar to a phase-sensitive rectification. In the example shown in FIG. 1, raster lines with phase $\phi=0$ can thus be unambiguously distinguished from those with phase $\phi=\pi$. Each of these groups of lines again has three times the spacing compared with an unmodulated line raster so that the risk of incorrect allocation is also correspondingly reduced for the modulated raster lines.

Figure 2:
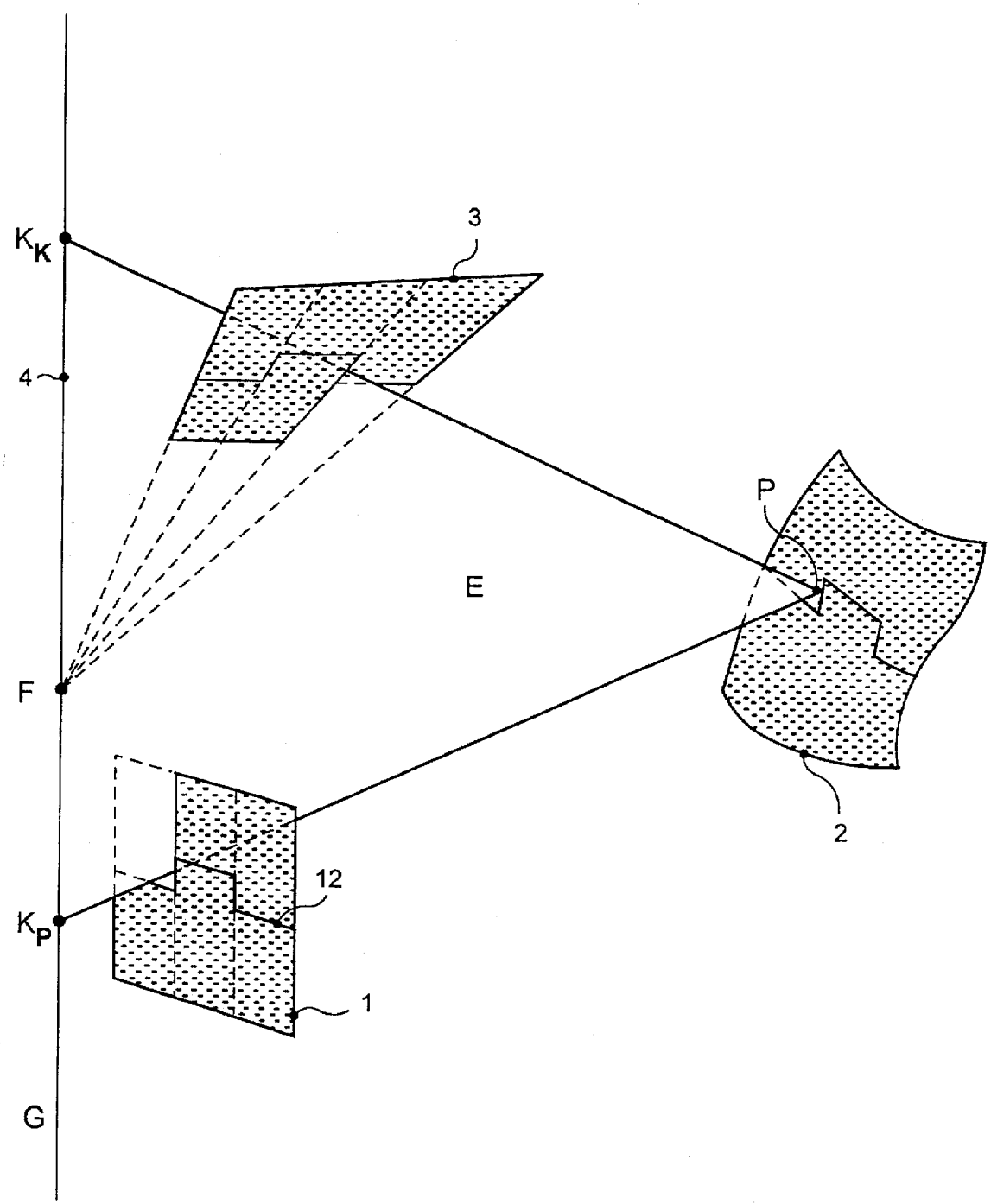
FIG. 2 shows the raster-stereographic recording geometry using the example of a square-wave-modulated raster line.

FIG. 2 shows a schematic view of the recording geometry which is preferably used for this method. The nodal point of the projector $K_p$ and the nodal point of the camera $K_k$ form the stereo base. The imaging systems are shown in an inverted manner as is conventional. In the example shown here using raster lines 11 to 19 in the form of square-wave modulation oscillations, the stereo base 4 is oriented parallel to the diapositive 1 and vertically to the selected individual raster line 12 (ideal geometry). The raster line 12 is projected onto the surface 2 to be measured. It is imaged in the camera focal plane 3.

The jump locations (locations of constant phase in diapositive 1) mentioned above are projected onto the surface 2 by the projector lens system. They lie on a bundle of planes having the common straight line G. The straight line G lies parallel to the diapositive 1 and intersects nodal point $K_p$. In the ideal geometry according to FIG. 2, the straight line G coincides with the stereo base 4. The planes of the amplitude jumps then form so-called epipolar planes E. FIG. 2 shows an individual epipolar plane E which is defined by G and by the surface point P. The traces of the epipolar planes E in the camera focal plane 3 are referred to as epipolar rays or epipolars (shown in dashed lines in FIG. 2). They form a bundle of straight lines with a common intersection (vanishing point F) in the camera focal plane 3. This vanishing point F at the same time represents the intersection of the camera focal plane 3 with the straight line G.

In the projector focal plane in which the diapositive 1 is located, the epipolar rays form a system of parallel lines. With respect to the modulation of raster line 12, they represent the locations of constant phase. Thus, the locations of constant phase, especially the jump locations of raster line 12, are represented in the camera focal plane 3 by the epipolars, namely regardless of the position and shape of the analyzed surface 2. With small deviations from the ideal geometry, certain errors occur as will be discussed in the following.

The vanishing point F and the epipolars of the jump locations in the camera focal plane 3 can be calculated from the geometry of the arrangement. For example, this can be determined by known methods of photogrammetric calibration (e.g., *Photogrammetric Engineering and Remote Sensing* 48 [1982], 67–72 and 215–220).

The image analysis is then effected in such a way that the smooth, unmodulated raster lines 11, 14, 17 are first determined by means of a line search algorithm. In a second step, those raster lines 12, 15, 18 having a positive jump on the epipolars at constant phase $\phi=0$, $2\pi$, $4\pi$, etc. and a negative jump at phase $\phi=\pi$, $3\pi$, $5\pi$, etc are searched. Subsequently, the raster lines 13, 16, 19 having a jump in the opposite direction, respectively, at these locations are searched.

A variant of the raster pattern 1 shown in FIG. 1 consists in modulating all raster lines with different phases. The repetition frequency of raster lines with the same phase (3 in the preceding example) can accordingly be increased and the reliability of the line identification can be improved. However, the number of line codings enabled in this manner is limited by the resolution of the camera.

In principle, it is also possible to make use of the amplitude for coding. However, since the imaging of the amplitude varies depending on the surface inclination, only rough gradations, as in the preceding example, are practical. The period length T or (spatial) frequency can also be used for coding, wherein the camera resolution is likewise the substantial limiting factor. In order to reduce the risk of aliasing effects, the frequencies employed should have no harmonics of a common base frequency.

Further, raster lines having pieces with different modulations are also conceivable, although likewise under the restrictions mentioned above.

Finally, different waveforms can be used. The advantage of square-wave functions consists in simple local phase detection. Provided a sufficient number of complete periods T can be measured, sine-shaped or similar constant waveforms are also possible. In this case, also, the raster lines are identified by filtering by means of phase-sensitive rectification.

Possible deviations from the ideal geometry assumed in the preceding will be discussed in the following for the raster line structures with square-wave modulation which are applied in the example.

In practice, it is not possible to realize the ideal geometry exactly. Therefore, errors occur, as a result of which the locations of constant phase in the camera focal plane can no longer be predicted accurately (i.e., without knowledge of the position and shape of the surface). Therefore, for practical application, it is important to know at what magnitude possible alignment errors will have a negligible effect on the accuracy of prediction of the epipolars.

The geometry errors involve the orientation of the stereo base 4 relative to the diapositive 1. If the stereo base 4 is not aligned parallel with the diapositive 1 and vertically with respect to the raster lines 11 to 19, the camera nodal point $K_k$ does not lie on the straight line G (FIG. 2). In this case, the locations of constant phase in the camera image depend upon the position and shape of the surface.

However, this dependence is low if the depth modulation of the surface is small in comparison to its distance from the stereo base 4 and if the camera nodal point $K_k$ lies sufficiently close to the straight line G. The resulting errors can be estimated from the lateral deviation $\Delta x$ and from the longitudinal deviation $\Delta z$ of the camera nodal point $K_k$ from the straight line G (FIGS. 3 and 4).

Figure 3:
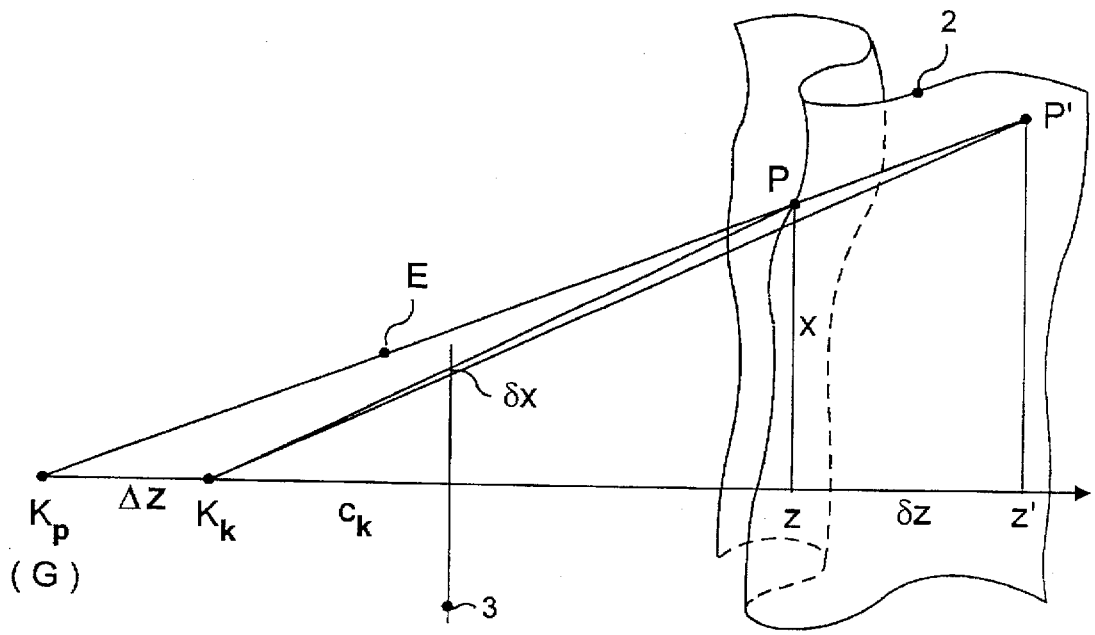
FIG. 3 shows a schematic view for illustrating the longitudinal camera error.
Figure 4:
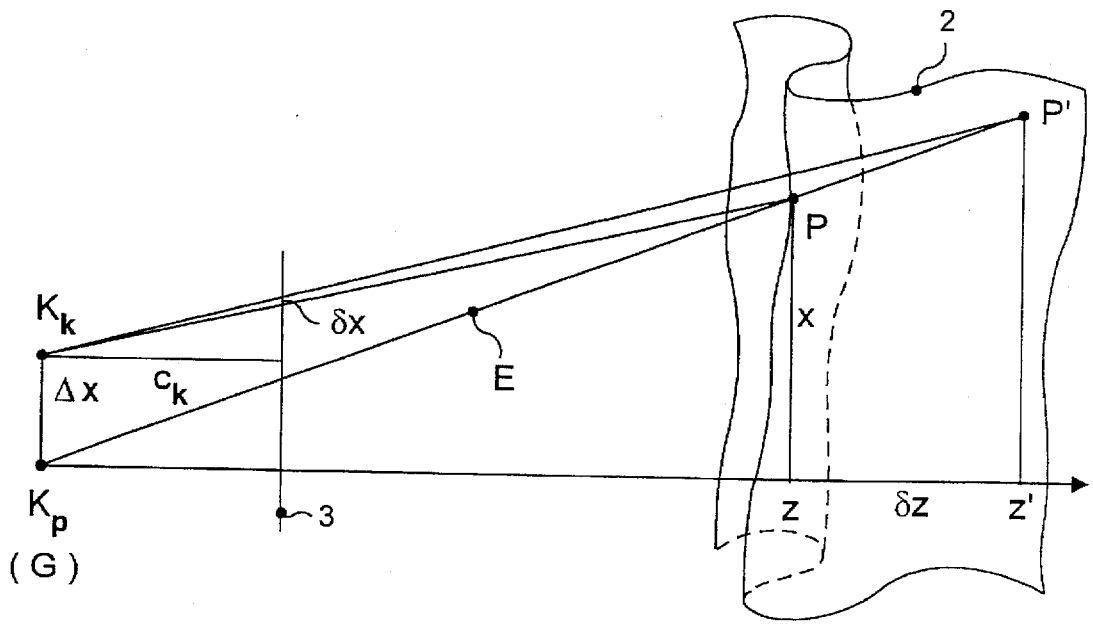
FIG. 4 shows a schematic view for illustrating the lateral camera error.

FIG. 3 shows the effect of a longitudinal deviation $\Delta z$. The diapositive 1 (not shown in the drawing) and the straight line G are at right angles to the drawing plane. The epipolar planes E (surfaces of constant phase) are therefore also at right angles to the drawing plane and pass through $K_p$. The camera nodal point $K_k$ diverges from the reference position on the straight line G by $\Delta z$. The image rays $\overrightarrow{K_pP}$ and $\overrightarrow{K_pP'}$ extending in an epipolar plane E strike the surface 2 at points P and P' at different depths z and $z^1$ (depth modulation $\delta z$ of surface 2). Since $K_k$ does not lie on G, the camera image rays $\overrightarrow{K_kP}$ and $\overrightarrow{K_kP'}$ also do not lie on the epipolar plane E. Therefore, the surface points P and P' are no longer projected on the same epipolars in the camera focal plane 3. This gives an error $$\delta x = -\delta z \cdot \Delta z \cdot x \cdot c_k / z^3 \quad (2)$$

or $$\delta x = -\delta z / z \cdot \Delta z / z \cdot x / z \cdot c_k \quad (2a)$$

in the camera image point with respect to the epipolars for the reference value of distance z, where x represents the lateral distance of this point from the center plane (plane of symmetry of the arrangement) and $c_k$ represents the calibrated focal length of the camera (principal distance).

A lateral deviation $\Delta x$ has a similar result (FIG. 4):

$$\delta x = \delta z \cdot \Delta x \cdot c_k / z^2 \quad (3)$$

$$\delta x = \delta z / z \cdot \Delta x / z \cdot c_k \quad (3a)$$

It will be seen from the form of equations (2a) and (3a) that the errors depend in each instance on the ratio of the deviations $\Delta x$ and $\Delta z$ to the distance z, that is, the errors are generally small. The other factors in the equations are, as a rule, smaller than 1. Moreover, the error is naturally proportional to the principal distance $c_k$.

Both errors are additive. Allowing for the finite resolution of the semiconductor video cameras which are customarily used, the permissible errors $\Delta x$ and $\Delta z$ of the camera position generally lie in the order of magnitude which can be maintained at a low expenditure on alignment means provided the depth modulation $\delta z/z$ of the surface lies in the order of magnitude of 10-20% of the camera-to-object distance.

Accordingly, the application of raster lines 11 to 19 with square-wave modulation as discussed in the example results in a device with increased raster line density which can be realized in a simple manner and by which the image analysis of the raster imaging which is distorted by the surface can be effected easily without disproportionately high expenditure on alignment means.

While the foregoing description and drawings represent the present invention, it will be obvious to those skilled in the art that various changes may be made therein without departing from the true spirit and scope of the present invention.

What is claimed is:

1. In a device for raster-stereographic measurement of body surfaces in which a raster pattern having a plurality of raster lines is projected onto a body surface according to the method of raster-stereography by a raster projector and a line image which is distorted by the surface shape is recorded by a camera which forms a stereo base with the raster projector, said raster pattern having periodically recurring, particularly emphasized lines, where the order number of the lines can be deduced from the regular recurrence of these particularly emphasized lines, the improvement comprising: means for providing that the raster pattern which is projected onto a surface contains continuous locally modulated raster lines modulated in a direction perpendicular to a direction of extension of the respective raster lines, wherein at least adjacent raster lines are clearly distinguished from one another.

2. The device according to claim 1, wherein said raster pattern from said providing means contains raster lines with periodic structures of different shape.

3. The device according to claim 2, wherein said raster pattern from said providing means contains raster lines in the form of representations of harmonic oscillations.

4. The device according to claim 2, wherein said raster pattern from said providing means has raster lines in the form of square-wave modulation oscillations.

5. The device according to claim 2, wherein said raster pattern from said providing means has raster lines in the form of sawtooth modulation oscillations.

6. The device according to claim 2, wherein oscillation images with different amplitude are used as raster lines in said raster pattern from said providing means.

7. The device according to claim 2, wherein oscillation images with different phase position are used as raster lines of said raster pattern from said providing means, wherein said raster pattern is arranged substantially parallel to a stereo base.

8. The device according to claim 2, wherein oscillation images with different frequencies are used as raster lines in said raster pattern from said providing means.

9. The device according to claim 1, wherein raster lines with different light wavelengths are used in said raster pattern.

10. The device according to claim 1, wherein raster lines having pieces with different modulation are used in said raster pattern.

11. The device according to claim 1, wherein unmodulated raster lines are also contained in said raster pattern between differently modulated lines.

12. The device according to claim 1, wherein different raster lines are repeated sequentially in said raster pattern.

13. The device according to claim 12, wherein a sequence of raster lines is composed of an optional number of different raster lines.

14. The device according to claim 11, wherein only the same raster lines of different sequences, can be evaluated at first in a rough analysis.

15. The device according to claim 12, wherein said raster pattern is composed of recurring sequences of raster lines in the form of square-wave modulation oscillations with different phase position ($\phi$) and/or different amplitude (A).

16. The device according to claim 15, wherein said raster pattern is formed of sequences of an unmodulated raster line and two raster lines in the form of square-wave modulation oscillations with $\pi$-shifted phase.

17. The device according to claim 4, wherein said raster pattern is oriented substantially parallel to a stereo base, wherein the direction of the raster lines is oriented substantially at right angles to the stereo base.

18. The device according to claim 13, wherein said optional number is three.

19. The device according to claim 14, wherein the same raster lines of different sequences are unmodulated raster lines.

20. In a device for raster-stereographic measurement of body surfaces in which a raster pattern having a plurality of raster lines is projected onto a body surface according to the method of raster-stereography by a raster projector and a line image which is distorted by the surface shape is recorded by a camera which forms a stereo base with the raster projector, said raster pattern having periodically recurring, particularly emphasized lines, where the order number of the lines can be deduced from the regular recurrence of these particularly emphasized lines, the improvement comprising: means for providing that the raster pattern which is projected onto a surface contains raster lines with different line thicknesses, wherein at least adjacent raster lines are clearly distinguished from one another.

21. The device according to claim 20 wherein said raster pattern from said providing means contains raster lines with periodic structures of different shape.

22. The device according to claim 21 wherein said raster pattern from said providing means contains raster lines in the form of representations of harmonic oscillations.

23. The device according to claim 21 wherein said raster pattern from said providing means contains raster lines in the form of square-wave modulation oscillations.

24. The device according to claim 21 wherein said raster pattern from said providing means contains raster lines in the form of sawtooth modulation oscillations.

25. The device according to claim 21 wherein oscillation images with different amplitude are used as raster lines in said raster pattern from said providing means.

26. The device according to claim 21 wherein oscillation images with different phase position are used as raster lines of said raster pattern from said providing means, wherein said raster pattern is arranged substantially parallel to a stereo base.

27. The device according to claim 21 wherein oscillation images with different frequencies are used as raster lines in said raster pattern from said providing means.

28. The device according to claim 21 wherein different raster lines are repeated sequentially in said raster pattern.

* * * * *